2 Sheets—Sheet 1.

S. O. CAMPBELL.
Seeding-Machine.

No. 208,887. Patented Oct. 15, 1878.

WITNESSES
Saml R Turner
C M Sites

INVENTOR
Solon O. Campbell
By R. S. & A. P. Lacey
ATTORNEY

N. PETERS, PHOTO-LITHOGRAPHER, WASHINGTON, D. C.

2 Sheets—Sheet 2.

S. O. CAMPBELL.
Seeding-Machine.

No. 208,887.  Patented Oct. 15, 1878.

WITNESSES
David R. Turner
C. M. Sites

INVENTOR
Solon O Campbell
By R.S. & A.P. Lacey
ATTORNEYS

N. PETERS, PHOTO-LITHOGRAPHER, WASHINGTON, D. C.

UNITED STATES PATENT OFFICE.

SOLON O. CAMPBELL, OF TOWER HILL, ILLINOIS.

IMPROVEMENT IN SEEDING-MACHINES.

Specification forming part of Letters Patent No. 208,887, dated October 15, 1878; application filed January 24, 1878.

*To all whom it may concern:*

Be it known that I, SOLON OWEN CAMPBELL, of Tower Hill, in the county of Shelby and State of Illinois, have invented certain new and useful Improvements in Seeding-Machines; and I do hereby declare that the following is a full, clear, and exact description thereof, which will enable others skilled in the art to which it pertains to make and use the same, reference being had to the accompanying drawing, and to the letters of reference marked thereon, which form a part of this specification.

My invention has for its object to furnish an improved grain planting and cultivating machine; and it consists in the construction, combination, and arrangement of the several parts hereinafter described.

Figure 1:
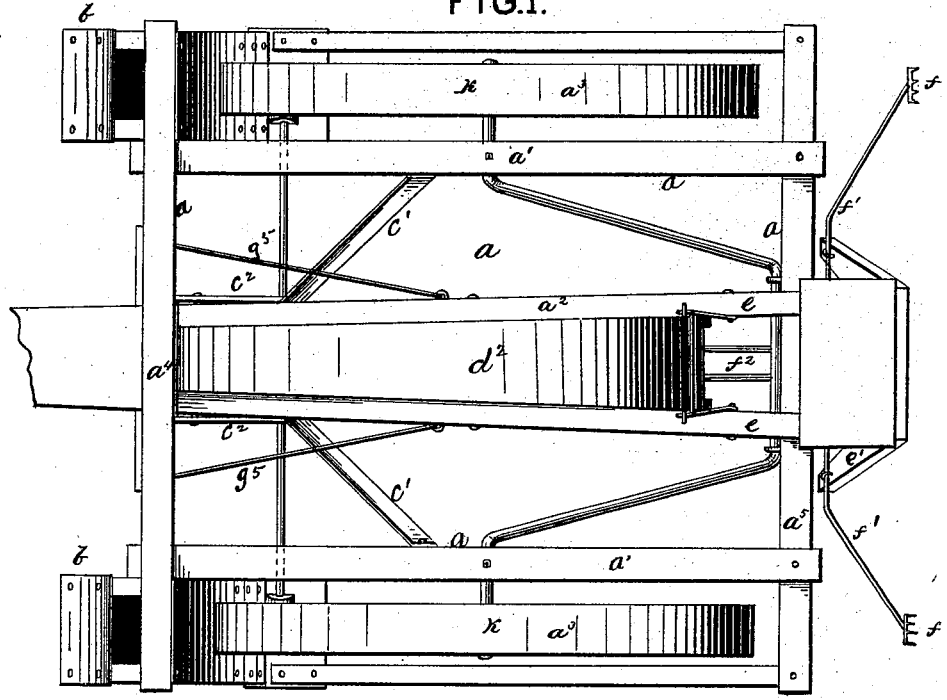
Figure 2:
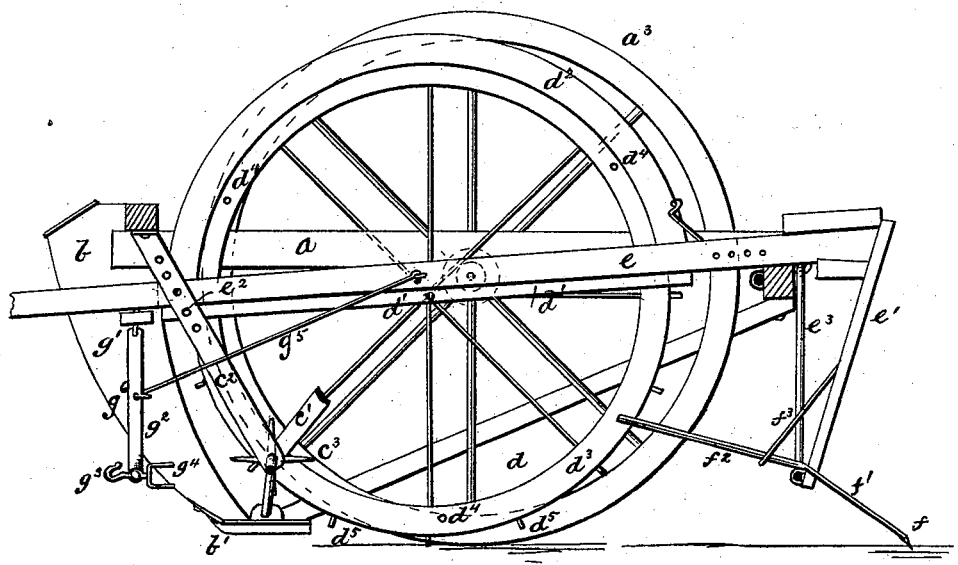
Figure 3:
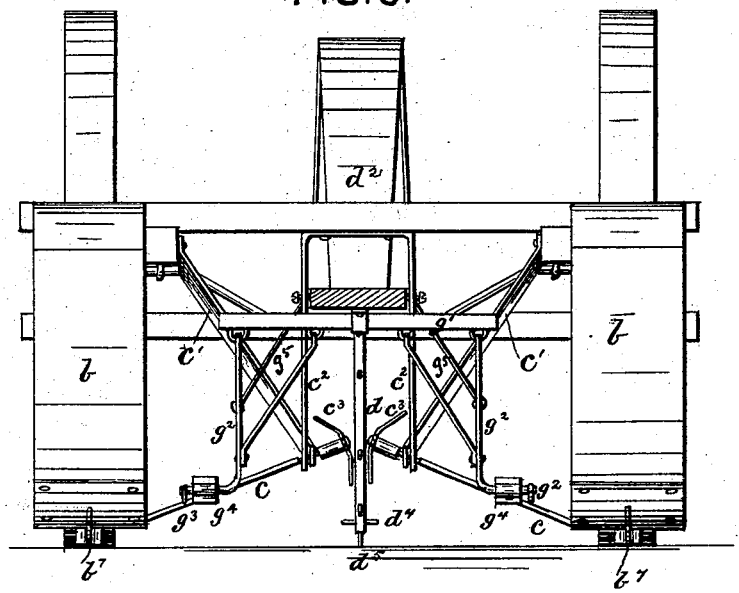
Figure 4:
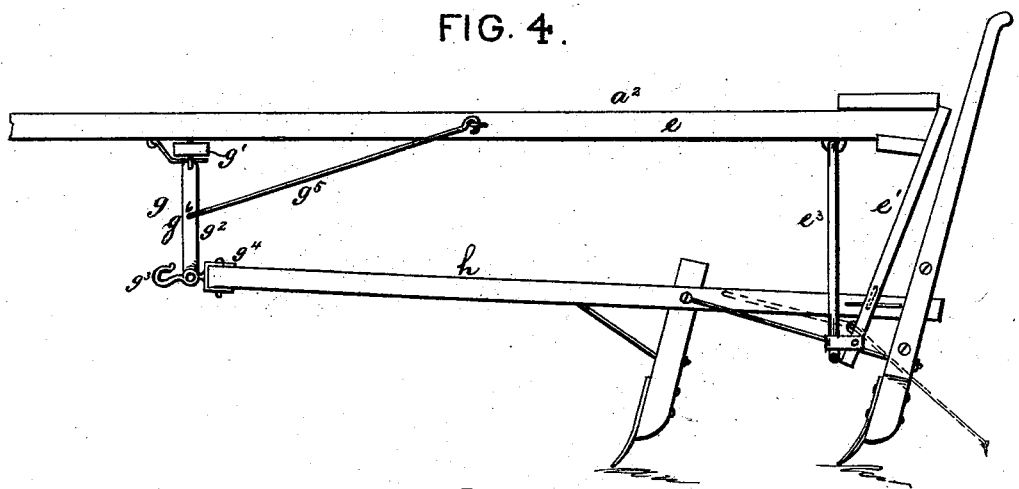
Figure 5:
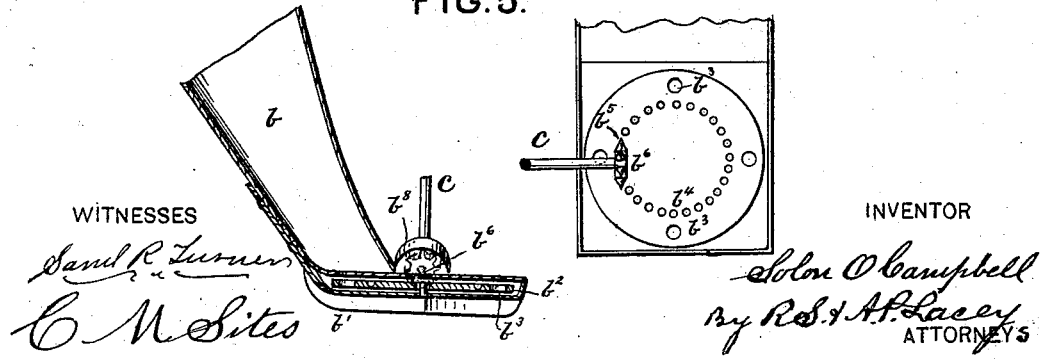

In the drawings, Figure 1 is a plan view. Fig. 2 is a vertical longitudinal section. Fig. 3 is a front-end elevation of a planter constructed according to my invention. Fig. 4 shows a portion of my planter converted into a cultivator-frame; and Fig. 5 is a detail view.

$a$ is the planter-frame, composed of the main frame $a^1$ and the detachable frame $a^2$. It is supported on wheels $a^3$ $a^3$, turning on axes secured to the main frame $a^1$.

On the forward end of the frame $a^1$ and in line with the wheels $a^3$ $a^3$ are affixed the corn-boxes $b$, which curve backward under and extend downward, so as to touch the ground in front of and near the point where the wheels rest. On the lower end of the boxes $b$ are affixed hollow runners $b^1$ $b^1$, in which are journaled horizontal revolving dropping-wheels $b^2$, which are provided with a series of dropping or corn recesses, $b^3$, and a series of holes, $b^4$, in which the teeth $b^5$ on the pinions or cog-wheels $b^6$ engage.

The grain is received by the recesses $b^3$ from the boxes $b$, and is dropped to the ground, as the dropping-wheels $b^2$ revolve, through suitable openings $b^7$ in the bottoms of the runners $b^1$. The pinions $b^6$ are affixed on shafts $c$ $c$, journaled in the bearings $b^8$ on the runners $b^1$ and in the ends of the braces $c^1$ $c^1$ $c^2$ $c^2$, secured to the frame $a^1$, as shown.

The shafts $c$ $c$ are inclined upward, and have their ends brought close together at the front center of the frame $a^1$, and are furnished with star-wheels $c^3$ $c^3$, having four points, which are engaged by pins on the side of the gage-wheel $d$, and made to revolve, and thus give motion to the pinion $b^6$, and turn the dropping-wheel $b^2$ one-fourth of a revolution by each pin.

The gage-wheel $d$ is provided with a suitable axis, which turns in bearings in the cross plate or bar $d^1$ of the semicircular shield $d^2$, which is affixed with a capability of ready removal from between the side bars of the detachable frame $a^2$. It is made of any suitable size, and has provided on the sides of its rim $d^3$ the pins $d^4$, which engage the points of the star-wheels $c^3$, as hereinafter explained.

The gage-wheel $d$ is so constructed and arranged that its rim $d^3$ does not touch the ground, but is provided on its edge with propelling pins or projections $d^5$, which reach to and enter the ground far enough to make a distinct mark and hold with sufficient firmness to cause the wheel to revolve. I make the gage-wheel $d$ by preference twelve feet in circumference, and place on each side of the rim $d^3$ three pins, $d^4$, equidistant apart, which indicates the planting of the grain in hills four feet apart; but it will be readily understood that the wheel $d$ may be of any desired circumference and have any desired number of pins $d^4$.

The rim $d^3$ may be provided with threaded pin-holes, so that the pins $d^4$ may be readily removed and again affixed firmly in position, so that the distances apart for planting the hills may be regulated at pleasure. The rim $d^3$ I, by preference, make thin, and the pins $d^4$ are made small, so that they will readily pass through and break any clods that may be in the way, and thus prevent varieties in the measurement, such as would be caused where the measuring-wheel is subject to be raised and lowered and thrown out of line. By this gage-wheel an exact measurement may be made of the distance over which the machine passes.

The detachable frame $a^2$ is composed of the two horizontal bars $e$ $e$, the forward ends of which are passed under the front cross-bar, $a^4$, of the frame $a^1$, and are extended outward, and secured together at their forward ends, and make the tongue, to which the horses are attached. The rear ends of the bars $e\ e$ are separated, and extend back over and outward from the rear cross-bar, $a^5$, and are secured together by suitable cross-pieces, and have attached to their ends the supporting-brace $e^1$. The forward end of the frame $a^2$ is secured between the braces $c^2\ c^2$, with capability of being set higher or lower by means of an adjusting-pin in holes $e^2$, for the purpose of setting the machine to plant deep or shallow, as desired.

The rider, who sits on a seat placed on the rear projecting end of the frame $a^2$, can, by properly shifting his weight, raise the forward end of the machine off the ground, when desired, for any special purpose.

$e^3$ is an axle, bent and secured to the bars $e\ e$ and brace $e^1$, as shown, and is used or not, as desired, for attaching wheels, when the the frame $a^2$ is employed for cultivators, as indicated in Fig. 4.

$f\ f$ are two small forks or hoes, placed on a bar, $f^1$, turning in bearings on the brace $e^1$, and to which are fixed the arms $f^2\ f^2$, which are operated by a spring, $f^3$, and extend to, and on opposite sides of, the gage-wheel $d$, and are engaged by the pins $d^4$. They are so constructed, arranged, and operated, as indicated, that they will, at the proper moment, be made to strike and loosen the earth which has been compacted by the wheels $a^3\ a^3$ over and mark the place of the planted grains, so that the driver can see not only where to set the machine in starting, but can at all times keep himself fully advised as to the correctness with which the planting of the grain in checks is being done.

$g$ is the hitching device, which consists of the cross or rocking bar $g^1$, pivoted at its center to the tongue or frame $a^2$ at a point below the front cross-bar $a^4$ of the frame $a^1$. On its ends are suitably hinged the vertical draft-bars $g^2$, to the ends of which are fixed the hooks $g^3$ for the whiffletrees and clevises $g^4$, to which the cultivator-beams are attached. At the center of the draft-bars $g^2$ are affixed the front ends of the brace-rods $g^5$, the rear ends of which are fixed to the sides of the bars $e\ e$, as shown.

This arrangement of the bar $g^1$, bars $g^2$, and rods $g^5$ gives to the different sides of the hitching device an alternate and rocking movement in opposite directions of the ends of the corresponding parts, so that the draft is perfectly regulated thereby.

By this hitching device I am enabled to attach the horses at a point near the ground, and at the same time preserve equilibrium of draft, and provide ready means whereby the frame $a^2$ may be employed as a part of the planter-frame, or detached and employed as a cultivator-frame.

The frames $a^1$ and $a^2$ may be readily separated, and the cultivator $h$ attached to the clevises $g^4$ on the hitching device $g$.

The manner of separating or attaching the frames $a^1\ a^2$ will be readily understood by inspection of the drawings.

The wheels $a^3\ a^3$ are provided with broad tires $k$, which may be removed or attached at pleasure. I employ the tires when the ground is cloddy, or when it is desired to compact or roll the earth on the planted grain.

Having described my invention, what I claim, and desire to secure by Letters Patent, is—

1. In a convertible frame for a sulky corn-planter and plow, the arrangement of the frame $a$, having the front and rear cross-bars, $a^4\ a^5$, and braces $c^2\ c^2$, with pin-holes $e^2$, frame $a^2$, having its rear end resting on the cross-bar $a^5$, while its forward end is passed under the front cross-bar, $a^4$, and is secured between the braces $c^2\ c^2$, with capability of being set higher or lower, as desired, and gage-wheel $d$, journaled in the cross-bar $d^1$ of the shield $d^2$, and supported between the side bars, $e\ e$, of the frame $a^2$, substantially as and for the purposes set forth.

2. The combination, with the frame $a^1$, of the curved grain-boxes $b$, constructed with hollow runners. $b^1\ b^1$, in which are journaled the revolving dropping-wheels $b^2$, and secured in front and in line with and bent back and under the wheels $a^3\ a^3$, substantially as set forth.

3. The hollow runner or furrower-opener $b^1$, having the discharge-opening $b^7$, and secured to the lower end of the curved grain-box $b$, horizontal dropping-wheel $b^2$, journaled in the runner $b^1$, and pinion $b^6$ on shaft $c$, journaled in a bearing, $b^8$, on said runner, and connected with the driving mechanism of the planter, all arranged with reference to the main frame, and to operate substantially as set forth.

4. The combination, with the dropping-wheels $b^2$, having holes $b^4$, and gage-wheel $d$, having pins $d^4$, of the star-wheels $c^3$, shafts $c$, supported in the bearings $b^8$, and braces $c^1\ c^2$, and pinions $b^6$, substantially as and for the purposes set forth.

5. The shield $d^2$, having cross-bar $d^1$, and held by suitable pins between the bars $e\ e$ of the frame $a^2$, with capability of easy removal therefrom, gage-wheel $d$, provided with pins $d^4$, and having its axis journaled in the cross-bar $d^1$, frame $a^2$, having brace $e^1$, and arms $f^2$, for operating the hoes or markers $f$, arranged to operate substantially as and for the purposes set forth.

In testimony that I claim the foregoing as my own I affix my signature in presence of two witnesses.

SOLON OWEN CAMPBELL.

Witnesses:
THOMAS B. HUNT,
LAFAYETTE HIGGINBOTHAM.